United States Patent [19]

Cooper

[11] 4,436,788
[45] Mar. 13, 1984

[54] COMPOSITE STRETCH WRAP FILM

[75] Inventor: Barry A. Cooper, Wayzata, Minn.

[73] Assignee: Bemis Company, Inc., Minneapolis, Minn.

[21] Appl. No.: 446,055

[22] Filed: Dec. 1, 1982

Related U.S. Application Data

[62] Division of Ser. No. 119,192, Feb. 2, 1980.

[51] Int. Cl.³ .................. B32B 27/06; C08L 23/16
[52] U.S. Cl. ................................ 428/483; 428/484;
428/349; 428/516; 428/520; 428/323; 428/35;
524/310; 264/176 K
[58] Field of Search ............... 525/222; 428/520, 516,
428/484, 483, 349

[56] References Cited

U.S. PATENT DOCUMENTS

| | | | |
|---|---|---|---|
| 4,082,877 | 4/1978 | Shadle | 428/35 |
| 4,126,649 | 11/1978 | Decroix | 525/222 |
| 4,194,039 | 3/1980 | Mueller | 428/213 |
| 4,222,913 | 9/1980 | Cooper | 524/313 X |
| 4,247,584 | 1/1981 | Widiger et al. | 428/520 X |
| 4,252,846 | 2/1981 | Romesberg et al. | 428/520 X |

FOREIGN PATENT DOCUMENTS

| | | | |
|---|---|---|---|
| 1059719 | 8/1979 | Canada | 428/520 |
| 53-37784 | 4/1978 | Japan | 428/520 |
| 53-38491 | 4/1978 | Japan | 428/520 |
| 55-86750 | 6/1980 | Japan | 428/520 |

Primary Examiner—P. Ives
Attorney, Agent, or Firm—Senniger, Powers, Leavitt and Roedel

[57] ABSTRACT

A composition adapted for processing into stretch wrap film. The composition comprises between about 40 and about 90% by weight of a high molecular weight copolymer of ethylene and vinyl acetate containing between about 4 and about 25% by weight of repeating units derived from vinyl acetate and having a melt index of between about 0.1 and about 4.0. The composition further comprises between about 8 and about 55% by weight of a linear copolymer of ethylene and a higher alkene. Such linear copolymer has a specific gravity of between about 0.917 and about 0.945. The invention further includes stretch wrap film, a method of producing stretch wrap film of differential cling properties, and a composite film constituted of a layer of the aforesaid ethylene vinyl acetate copolymer and a layer of the liner copolymer of ethylene and a higher alkene.

12 Claims, 4 Drawing Figures

FIG. I

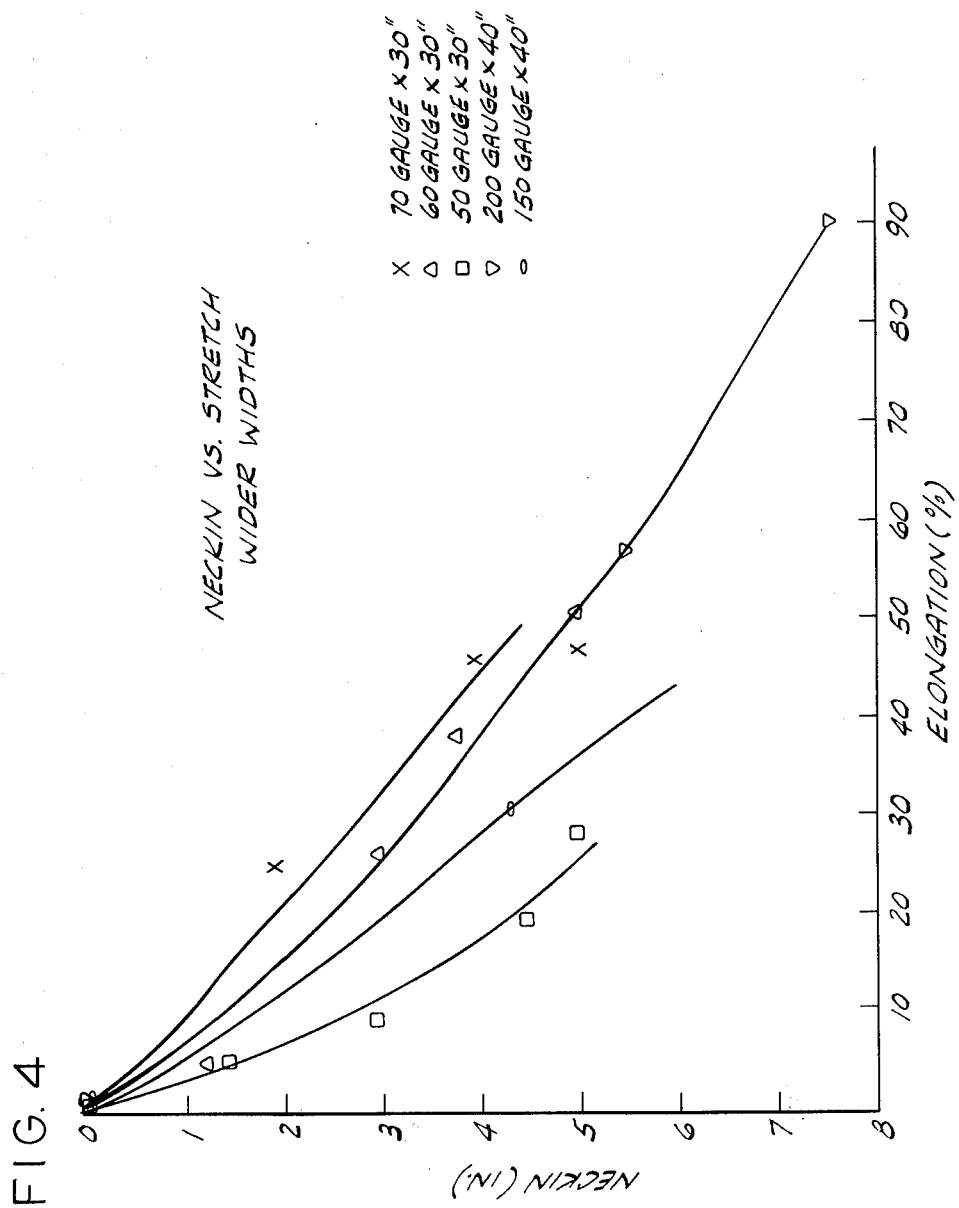

COMPOSITE STRETCH WRAP FILM

This is a division of application Ser. No. 119,192, filed Feb. 2, 1980.

BACKGROUND OF THE INVENTION

This invention relates to polymeric packaging film, and more particularly to compositions and films having properties useful for stretch wrapping of palletized loads such as boxes, bags, and the like.

Conventionally, the polymeric films utilized for stretch wrapping of palletized loads are constituted of polyvinyl chloride, polyethylene, and ethylene/vinyl acetate copolymers. Although polyvinyl chloride film is a popular pallet stretch wrap material, it possesses a low ultimate tensile strength is elongation, poor puncture resistance, and high specific gravity which yields a low area of film per unit weight. Polyvinyl chloride film is especially poor in stress relaxation, losing 70% of its initial tension after 16 hours when stretched to 30% elongation.

Conventional low-density polyethylene is less than an ideal candidate for stretch pallet wrapping because of its relatively low machine direction ultimate tensile strength and elongation, poor puncture resistance, poor resistance to transverse tear under machine direction tension, and low layer-to-layer tacking. Also, low-density polyethylene generally cannot be produced in thin gauges, particularly from resins having adequate strength and toughness properties.

While ethylene/vinyl acetate copolymers are potential candidates for stretch pallet wrap film materials, those having less than about 4% vinyl acetate content are similar to and exhibit most of the deficiencies of low-density polyethylene. On the other hand, those ethylene/vinyl acetate copolymers which have a vinyl acetate content of more than about 4% are normally of low molecular weight and lack desired physical properties, including ultimate tensile strength, tear resistance, impact resistance, and stress relaxation properties.

Illustrative prior patents relating to stretch wrap films include U.S. Pat. Nos. 3,433,573 and 3,932,563.

In my copending and coassigned U.S. application Ser. No. 961,293, now U.S. Pat. No. 4,222,913, I describe a stretch wrap film which contains 79 to 98% by weight of a high molecular weight ethylene/vinyl acetate copolymer, 1 to 18% by weight of a propylene copolymer, and 0.3 to 5% by weight of a tackifier agent. This blend provides stretch wrap film properties that compare favorably to the prior art with regard to strength, stress relaxation, tear resistance, puncture resistance, and other parameters important for stretch film applications. A need has remained, however, for film possessing even more favorable processability and mechanical properties. In particular, there has been a need for a film having greater elongation with minimal neckin, a decreased melt strength to permit drawing of thin film, and an increased melting point. There is also a need for such a film having desirable cling properties and, more particularly, such a film which exhibits differential cling, i.e., having one side of the film more tacky than the other. Differential cling characteristics not only facilitate storing of the film on a roll without blocking thereof, but also allow packaging to be carried out with secure adherence of overlapping wraps of the stretch film yet minimize package-to-package adherence that may otherwise cause inconvenience in material handling and even tearing of the packaging film when adjacent packages become stuck to one another and must be separated.

German Offenlegungsschrift No. 28 21 733 describes a film composed of low density polyethylene and polyisobutene which is treated by corona discharge on one surface to develop differential cling, the treated surface thereby becoming more tackey than the untreated surface. However, this material exhibits very limited elongation and other properties desired in a stretch film.

SUMMARY OF THE INVENTION

Among the several objects of the present invention may be noted the provision of a novel composition suitable for processing into a stretch wrap film; the provision of such a composition which has a high elongation; the provision of such a film which has a relatively high melting point and relatively low melt strength; the provision of such a composition which can be processed into a film that can be stretched extensively with minimal neck-in; the provision of such a composition which can be processed into a film having a high ultimate tensile strength; the provision of such a composition which can be processed into a film having high puncture strength; the provision of such a composition which can be processed into a film having favorable stress relaxation properties; the provision of such a composition which can be processed into a film which retains elasticity under vibrating loads and is resistant to fatigue and creep; the provision of such a composition which can be processed into a film having resistance to tear propagation; the provision of such composition that can be processed into a strong, stretchable film in thin gauges and low film weight; the provision of such a composition which can be processed into a film having good cling properties; the provision of such a material which can be processed into a film having differential cling properties; the provision of film having the aforesaid advantageous properties; and the provision of a method for producing a film having favorable properties for use in stretch wrap applications including differential cling properties.

Briefly, therefore, the present invention is directed to a composition adapted for processing into stretch wrap film. The composition comprises between about 40 and 90% by weight of a high molecular weight copolymer of ethylene and vinyl acetate containing between about 4 and about 25% by weight of repeating units derived from vinyl acetate and having a melt index of between 0.1 and 4.0. The composition further comprises between about 8 and about 55% by weight of a linear copolymer of ethylene and a higher alkene. This linear copolymer has a specific gravity of between about 0.917 and about 0.945.

The invention is further directed to such a composition having cling properties and further comprising between 0.5 and about 6% by weight of a low molecular weight polyisobutene, a polyterpene, amorphous polypropylene or microcrystalline wax as a tackifier.

The invention is further directed to such a composition which includes not only a tackifier but also between about 0.25 and about 3% by weight of a monoester of a fatty acid and a polyol. The composition may further include between about 0.1 and about 2.0% by weight of an alkali metal stearate.

Also included in the invention is a film constituted of compositions of the aforesaid type.

In another embodiment, the invention is directed to a composite film adapted for use in stretch wrapping applications. One layer of the film comprises a high molecular weight copolymer of ethylene and vinyl acetate containing between about 4 and about 25% by weight of repeating units derived from vinyl acetate and having a melt index of between about 0.1 and about 2.0. Another layer comprises a linear copolymer of ethylene and a higher alkene, said linear copolymer having a specific gravity of between about 0.917 and about 0.945.

Additionally, the invention is directed to a novel method for the preparation of a film having differential cling properties. In this method, a polymer blend is prepared which comprises between about 40 and about 90% by weight of a high molecular weight copolymer of ethylene and vinyl acetate containing between about 4 and about 25% by weight of repeating units derived from vinyl acetate and having a melt index of between 0.1 and about 4.0; between about 8 and about 55% by weight of a linear copolymer of ethylene and a higher alkene, said linear copolymer having a specific gravity of between about 0.917 and about 0.945; between 0.5 and about 6% by weight of low molecular weight polyisobutene, amorphous polypropylene, polyterpene or microcrystalline wax as a tackifier; and between about 0.1 and about 2.0% by weight of an alkali metal stearate. This blend is extruded to produce a plastic film. One side only of the film is passed through a corona discharge zone, whereby the side of the film not subjected to corona discharge treatment exhibits greater cling properties than the side passed through the zone.

Other objects and features will be in part apparent and in part pointed out hereinafter.

BRIEF DESCRIPTION OF THE DRAWINGS

FIG. 4 is a plot comparable to FIG. 1 but for films of 30" and 40" width.

DESCRIPTION OF THE PREFERRED EMBODIMENTS

Figure 1:
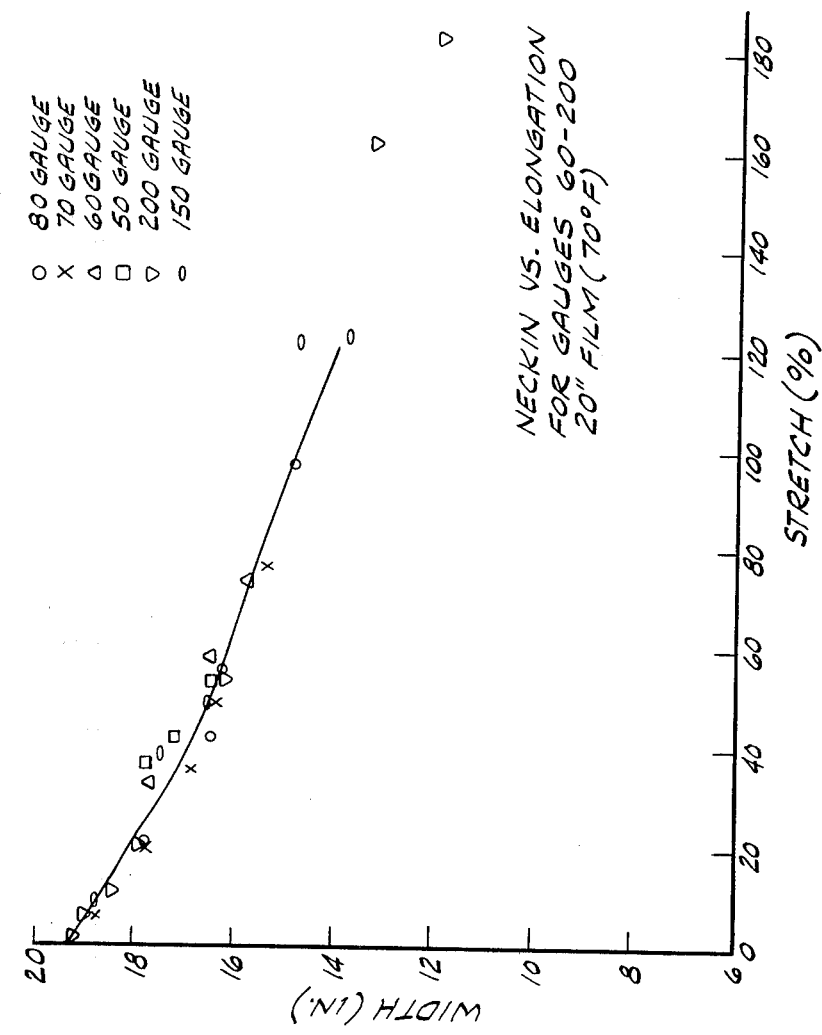
FIG. 1 is a plot of film width vs. elongation showing the extent of neck-in for films of the invention produced in 20" initial width and various thicknesses and tested at 70° F.

In accordance with the present invention, a novel polymer blend has been discovered which may be processed into a film having properties advantageous for use in stretch wrap applications. Film produced from this blend has a very high elongation, high ultimate tensile strength in the machine direction, and other favorable mechanical properties which afford tight, secure, tough packaging resistant to failure on exposure to the severe conditions of stretch wrap applications and the abuse unavoidably encountered in transportation and handling of packaged palletized loads.

Film produced according to the invention possesses certain properties which make it superior even to the film disclosed in my aforesaid copending and coassigned application. Processability is also improved. Having a lower melt strength, the polymer blends of this invention may be used to produce films that are drawn to a very thin gauge, thereby providing a savings in packaging material costs. At the same time, the film material has a somewhat higher melting point which allows any gels formed therein to freeze, rather than cause defects in the film or obstructions in the film extrusion die. Additionally, the film of the present invention exhibits much improved elongation, so that even in relatively thin gauges it can be stretched as much as 70% with very little neck-down.

It has been discovered that these and other highly advantageous properties are afforded by a unique blend of a high molecular weight ethylene/vinyl acetate copolymer with a linear copolymer of ethylene and a higher alkene. Blends containing between about 40 and about 90% of the high molecular ethylene/vinyl acetate copolymer and 8 to 55% by weight of the ethylene/higher alkene linear copolymer exhibit a stress/strain curve which is distinctly different from either ethylene/vinyl acetate alone or the blends of the type described in the aforesaid copending application. While blending high molecular weight ethylene/vinyl acetate with the propylene copolymers disclosed in Ser. No. 961,293 causes both the modulus of elasticity and the yield strength of the film to be increased, blending with ethylene/higher alkene linear copolymers as described hereinbelow effects a decrease in the early yield point, but thereafter provides an extensive elongation at a relatively low modulus. Ultimate strength of the film is in the range of 5500–6000 psi. This combination of properties provides exceptional stretch characteristics with minimal neck-down. Moreover, despite the early yield point, the blends possess highly favorable elastic recovery and stress relaxation characteristics. Thus the film maintains 65% of the original stress after 16 hours, even where a thin gauge film, e.g. 80 ga., has been stretched up to 70%. Under the same conditions, release of tension on the film results in substantial elastic recovery toward the original dimensions, with a permanent set of only 12–14%.

Because of high ultimate strength combined with low melt strength and minimal neck-down at high stretch, films of the present invention can be drawn in gauges distinctly thinner than the competitive films commercially available. Thus, while commercial stretch wrapping film is typically provided in thicknesses of approximately 1 mil, the film of the present invention is highly practical in thicknesses in the neighborhood of 80 gauge or even thinner, thereby providing a substantial weight saving for a given application. Moreover, use of the preferred lower density forms of the linear copolymer of ethylene and a higher alkene affords further savings in film weight per unit area and cost.

Films of this invention also possess a high degree of puncture resistance and limited tear propagation in the transverse direction. In fact, until puncture tear failure is approached, tear propagation is negligible at temperatures below 85° F. These features, which result from the combination of low modulus and high strength, render the film most advantageous for wrapping over sharp corners and resisting abuse in handling. And even when cut or punctured, the stretch film retains its integrity as a wrapping for a packaged load. For the same reasons, the film may also be used in wrapping highly irregular objects. The film of the invention also maintains its elasticity under vibrating loads by equilibrating to the load while remaining resistant to creep and fatigue.

Wrapping films made according to the invention generally possess acceptable clarity and other optical characteristics. Where optical properties are of critical importance, the proportion of ethylene/higher alkene copolymer should be controlled below certain minimums, which vary with density. For example, to maintain a haze level of 4% or less as measured by ASTM procedure D-1003, the ethylene/higher alkene content should be maintained below about 52% by weight for a 0.920 specific gravity resin, 45% for a 0.926 specific gravity resin, and 24% for a 0.938 specific gravity resin.

Films of this invention may also be tinted with various oil-soluble dyes or colorants, in which case haze values are of somewhat lesser significance. Incorporation of conventional film dyes has no adverse effect on the mechanical properties of the film.

The ethylene/vinyl acetate copolymers (hereinafter sometimes referred to as "EVA") utilized in the blends of the invention are of high molecular weight and have a vinyl acetate content of between about 4 and about 25%, preferably between about 8 and about 18%. The molecular weight of the ethylene/vinyl acetate copolymer should be such as to exhibit a melt index of between about 0.1 and about 4.0, preferably 0.25-2.0. A typically useful ethylene/vinyl acetate resin is that sold under the trade designation "Elvax" EVA 3135 by E. I. du Pont de Nemours & Co. (Inc.), which contains about 12% vinyl acetate. Other useful high molecular weight EVA resins include those sold under the trade designations "USI 289" (4% EVA; melt index equals 2) and "Ultrathene-657" (USI 80159) by USI Chemicals Company Division of National Distillers and Chemical Corporation, the latter of which contains 12% vinyl acetate and has a melt index of 0.75. As noted, the EVA content of the blend may range from abut 40% to about 90% by weight of the blend. Preferably, it falls in the range of between about 50% and about 70% by weight.

Linear copolymers of ethylene and higher alkene as utilized in the blends of the invention may be referred to as "linear low-density polyethylene". Low-density polyethylene as produced by conventional high-pressure polymerization processes is highly branched, whereas conventional linear polyethylene is of relatively high density. However, copolymers of ethylene and higher alkene, such as those sold under the trade designations 61500.32, 34, 35, 42 and 45 by Dow Chemical Company, "DEFG 7047P" by Union Carbide, and "LPX-1102" by Exxon are linear but of relatively low density. Exxon "LPX-1102" has a specific gravity of 0.920 and a melt index of 2.0; Dow "61500.32" a specific gravity of 0.932 and a melt index of 2.0; "61500.34" a specific gravity of 0.920 and a melt index of 2.0, "61500.42" a specific gravity of 0.926 and a melt index of 2.0, and "61500.45" a specific gravity of 0.926 and a melt index of 1.0. Similar properties are possessed by those polymers whose preparation is described in Anderson et al. U.S. Pat. No. 4,076,698. Melt index of the linear low density polyethylene should be between about 0.5 and about 3.0. Typically useful comonomers for linear low-density polyethylene are butene, hexene and octene. However, there is no criticality to the identity of the comonomers, and a variety of alkenes can be used. As indicated above, it is preferred that the resin used for this component of the blend have a density as low as possible, most advantageously in the specific gravity range of 0.917 to 0.926. In such range the linear copolymer may favorably comprise 20 to 55% by weight of the overall blend, preferably between about 25% and about 45%, in order to provide the desired combination of mechanical properties. Somewhat higher density forms of linear low-density polyethylene can also be employed up to a specific gravity of about 0.945, in which case the proportion of this component of the blend preferably falls in the range of 8 to 35% by weight. The preferred limits on linear low density polyethylene content for optical purposes are referred to hereinabove.

Blends of EVA and linear low-density polyethylene as described above possess the aforementioned advantageous mechanical properties and are thus adapted for tight, secure packaging of palletized loads. Moreover, in the preferred embodiments of the invention wherein the film possesses self-cling properties, its mechanical strength is such as to generally resist blocking and picking. To impart the desired cling properties to the blends of the invention, it is preferred to include a tackifier and, most preferably, auxiliary components which permit differential cling properties to be imparted to the film. The function of such auxiliary components, which include alkali metal stearates and monoesters of fatty acids and polyols, is not clearly understood. The monoesters are themselves classifiable as tackifiers but in the presence of certain other tackifiers, the monoesters may act as release agents. Alkali metal stearates may behave as release agents but are also soaps that may serve as carriers to convey tackifiers to the surface, and perhaps perferentially to one side under the influence of corona discharge.

Both the tackifier and certain of the auxiliary components contemplated may be classified as oils. Blends of EVA and linear low-density polyethylene described above can tolerate 8 to 9% of oils without adverse effect on film properties, and this capacity has been found to permit incorporation of adequate tackifiers and auxiliary components to provide both the cling and differential cling properties desired.

As a tackifier, the preferred component is a low molecular weight polyisobutene. Although the exact molecular weight of this component is not critical, polyisobutenes having a molecular weight in the range of 600 to 2400 are satisfactory, with a molecular weight of approximately 1400 being preferred. For purposes of providing the desired cling properties, the polyisobutene may constitute from about 0.5 to about 6% by weight, preferably 2 to 4% by weight of the overall blend. Alternatively, amorphous polypropylene, a polyterpene or microcrystalline wax may be utilized as a tackifier. Where the latter component is used, the proportion of tackifier should be in the range of 0.5 to 3% by weight.

Cling properties are believed to be developed by exudation of the tackifier to the film surface. In order to provide differential cling, the aforesaid auxiliary components should be incorporated in the film blend.

Monoesters of a polyol, such as glycerol or sorbitan, and a fatty acid are preferably included not only to promote differential cling but also to impart lubricity to the film. Such esters may also serve as wetting agents to more effectively distribute an alkali metal stearate across a corona discharge-treated surface of the film. Preferably the ester utilized is derived from either glycerol or sorbitan and an acid having 10 to 20 carbon atoms. A particularly preferred ester is glycerol monooleate. The monoester may be present in the film blend in a proportion of between about 0.25 to about 3.0% by weight, preferably between about 0.5 to about 1% by weight.

An alkali metal stearate, preferably either sodium or potassium stearate, is considered essential to promote differential cling, and also serves to give gloss to the film. Most Preferably, film to be treated to develop differential cling should include both an alkali metal stearate and a polyol/fatty acid ester. Although the mechanism is not understood, the alkali metal stearate interacts synergistically with the monoester of fatty acid and polyol to provide greater cling on the side of the film opposite that exposed to corona discharge treatment. The blend may contain between about 0.1 to about 2%, preferably 0.2 to about 0.5%, of alkali metal stearate.

To produce stretch wrap film in accordance with the present invention, the ethylene/vinyl acetate and linear low-density polyethylene resins are initially tumble-blended to produce a uniform mix. In one alternative, a premixed powder comprising the alkali metal stearate and polyol/fatty acid monoester may be added to the dry polymer blend which is then extruded, with the tackifier injected at a metered rate into the extrusion head. In another alternative, a concentrate is prepared comprising approximately 10% sodium stearate in ethylene/vinyl acetate (EVA), and this concentrate is mixed with linear low-density polyethylene and additional EVA. These components are tumble blended after which the dry blend is extruded, with a heated premix of the polyol/fatty acid monoester and tackifier injected at a metered rate into the extrusion hopper.

In the extruder, the blend is heated to a temperature of between about 390° and about 450° F. Leaving the extruder, it is forced through a circular die, blown and drawn to produce a film which is wound and cut in a conventional fashion. In order to prevent pre-stretching of the film it is preferred that excessive winding tension be avoided. In manufacture of 80 ga. film, for example, the winding tension should be maintained at or below 3 lbs/linear inch in order to avoid pre-stretching. The film may be produced in a variety of thicknesses. For heavy duty applications, film thicknesses up to 10 mils may be used, but for most applications the thickness is preferably 2 mils or less. Because of the advantageous strength, elongation, and tear resistance properties of the film of the invention, very satisfactory film is produced in relatively thin gauge, for example 60–80 ga. Such film generally exhibits a high degree of clarity and gloss, together with performance properties equal or superior to those of conventional 1 mil thick commercial stretch wrap films, at a substantial reduction in resin weight per unit area of film.

To impart differential cling properties, one side of the film is passed through a corona discharge zone. Conventional equipment may be utilized for generating the corona discharge zone. The corona discharge system is typically operated at a voltage of 220 to 350 v. at a frequency of 96 Hz and a power density of 2–5 watts per square foot per minute. For reasons that are not understood, the greater degree of cling is exhibited by the side of the film opposite that exposed to corona discharge treatment. This effect is just the reverse of that reported in German Offenlegungsschrift 28 21 733.

In a separate embodiment of the invention, a composite film is prepared by coextrusion of EVA and linear low density polyethylene (LLDPE). According to this embodiment, a first composition containing at least about 90% by weight EVA and a second composition containing at least about 90% by weight LLDPE are fed separately to different extruders and the flow from the extruders passed to concentric dies or through a combining adapter which forms concentric flow patterns immediately upstream of a single circular die. Thus, the separately formed films are brought together and adhered together as a composite. Because of the compatibility of EVA and LLDPE resins, excellent adhesion between the layers is achieved.

Although LLDPE by itself becomes oriented when extensively elongated, and EVA is very rubbery, a composite of lamellarly adhered EVA/LLDPE undergoes extensive elongation while retaining impressive elastic recovery properties and exhibiting effective resistance to stress relaxation.

Preferably, the composite film of this invention comprises a three layer EVA/LLDPE/EVA structure. Such a composite exhibits significant cling properties even without the incorporation of any tackifier. Increased peel strength can be imparted by incorporation of glycerol monooleate or other monoester of a 10–20 carbon fatty acid and a polyol. Still greater tackiness can be provided by addition of polyisobutene, a polyterpene, amorphous polypropylene or monocrystalline wax. Alkali metal stearate may be included for its effect on optical and cling properties. The LLDPE layer preferably contains up to about 10% by weight EVA in order to enhance the machine direction tear strength of the composite.

The following examples illustrate the invention.

EXAMPLE 1

Stretch wrap film was produced from a resin blend containing 68% by weight of a high molecular weight ethylene/vinyl acetate copolymer having a melt index of 0.25 and containing 12% by weight repeating units derived from vinyl acetate, sold under the trade designation "3135X" by E. I. duPont deNemours & Co.; 30% by weight of a linear low density polyethylene having a specific gravity of 0.926 and a melt index of 2.0 sold under the trade designation 61500.42 by Dow Chemical Co.; 1% by weight of a polyisobutene having a molecular weight of about 1400 and a viscosity of 123,000 SSU at 100° F. sold under the trade designation "Chevron 32" by the Chevron Chemical Co., Division of Standard Oil Company (Calif.); and 1% by weight glycerol monooleate. To prepare the resin blend, pellets of the ethylene/vinyl acetate and linear low density polyethylene resins were tumble blended for 10 minutes in a Brower blender. An oil premix of the polyisobutene and glycerol monooleate was prepared and heated to 140° F. Both the blended resins and a metered flow of the oil premix were then fed into a 4½" extruder. A film was extruded from the resultant blend by passage through a 12" diameter blown-film die having a 0.027" die gap. The film was extruded at approximately 420° F., blown at a blow up ratio of 2.5, and drawn to 80 gauge and 90 gauge film. The film was slit in line and converted to 20" wide rolls of film on 3" cores.

The film produced in accordance with this example was wrapped over a box of resin using an Infra Pak Sidewinder II stretch wrapping machine. The film was successfully stretched 50–100% with very little observable neck-down. In further stretch wrap tests utilizing the same wrapping machine, ¼"×1" iron angles 1 to 6" long were attached to a side of the box of resin thus presenting sharp projections which subjected the film to a severe test of its puncture and tear properties. The film was successfully wrapped around the box and angles at high elongations. In certain instances the local stress was great enough to cause the film to puncture, but in no instance was their any significant tear propagation from the point of puncture.

EXAMPLE 2

A series of film was prepared in the manner described in Example 1 using blends of essentially the same composition as that of Example 1 but substituting the following linear low density polyethylenes:

Dow "61500.32", having a specific gravity of 0.932 and a melt index of 2.0

Dow "61500.35", having a specific gravity of 0.938 and a melt index of 2.0.

These films were subjected to the same stretch wrap tests described in Example 1, with comparably favorable results.

EXAMPLE 3

A roll of stetch film 20" wide × 0.8 mil thick × 1000' long was prepared from the composition set forth below:

Ethylene/vinyl acetate copolymer sold under the trade designation "Elvax 3135" by E. I. duPont de Nemours & Co.: 68% by weight linear low density polyethylene having a specific gravity of 0.920 and a melt index of 2.0 sold under the trade designation "61500.34" by the Dow Chemical Co.: 30% by weight glycerol monooleate: 1% by weight "Chevron 32": 1% by weight The components were blended and extruded and the film blown in the manner described in Example 1 except that the melt was heated to 460° F. in the extruder. Favorable elongation, neck-down, puncture, tear, stress relaxation and elastic recovery properties were exhibited by the film of this example.

EXAMPLE 4

A roll of stretch film 0.9 mils × 2000' long × 20" wide was prepared from the composition set forth below:

DuPont "3135": 58% by weight

Dow "61500.34": 40% by weight glycerol monooleate: 1% by weight

"Chevron 32": 1% by weight

The components were blended and extruded and the film blown in the manner described in Example 3. Favorable elongation, neck-down, puncture, tear, stress relaxation and elastic recovery properties were exhibited by the film of this example.

EXAMPLE 5

The film preparations of Examples 3 and 4 were repeated except that the films were produced in 30" and 45" widths. Comparably faborable results were obtained.

EXAMPLE 6

Rolls of stretch film 20" wide × 0.8 mils × 2,000' long were prepared from the compositions set forth below:

| Composition A. | |
|---|---|
| Ethylene/vinyl acetate copolymer sold under the trade designation "USI 289" by the USI Chemicals Company Division of National Distillers and Chemical Corporation | 48% by weight |
| Linear low density polyethylene having a specific gravity of 0.920 and a melt index of 1.0 sold under the trade designation "61500.45" by the Dow Chemical Company | 50% |
| glycerol monooleate | 1% |
| "Chevron 32" | 1% |
| Composition B. | |
| Dupont "3135" | 48% |
| Dow "61500.45" | 50% |
| glycerol monooleate | 1% |
| "Chevron 32" | 1% |

The components were blended and extruded and the film blown in the manner generally described in Example 1. The film was drawn at a rate of 100 ft./min. One side of the film was treated by passing it though a corona discharge zone at a voltage of about 300 v. and a discharge power density of about 2 volt-amp./ft.$^2$/min., thereby imparting differential cling properties to the film, with the side opposite that subjected to corona discharge treatment having the greater cling properties.

EXAMPLE 7

A series of 6 rolls of stretch film, each 20" wide × 0.8 mils thick × 2000' long, was prepared from the three compositions set forth below.

| Component | Blend C | Blend D | Blend E |
|---|---|---|---|
| "Dow 61500.45" ethylene/vinyl acetate copolymer | 68% | 63% | 58% |
| linear Low Density Polyethylene | 30 | 35 | 40 |
| "Chevron 32" | 1 | 1 | 1 |
| glycerol monooleate | 1 | 1 | 1 |

For the blend of each proportional composition, one roll was prepared in which the ethylene/vinyl acetate component was that sold under the trade designation "USI 80159" by the USI Industrial Chemical Division of National Distillers and another roll was prepared from a blend in which the ethylene/vinyl acetate component was duPont "3135".

In the preparation of each roll, the components were blended and extruded and the film blown in the manner described in Example 1 except that the premix of polyisobutene and glycerol monooleate was heated to 120° F. The film was drawn at a rate of 100 ft./min. and one side was passed through a corona discharge zone having an energy intensity of 2 v.-amps per ft.$^2$/min., thereby imparting differential cling properties to the film with the side opposite that passing through the corona discharge zone exhibiting the greatest cling properties.

EXAMPLE 8

Four rolls of stretch film each 0.8 mils thick × 8000' long, two having a width of 35" and two having a width of 45", were prepared from the composition set forth below:

USI "80159": 58%

Dow "61500.45": 40%

"Chevron 32": 1% glycerol monooleate: 1% sodium stearate: 0.2%

The components were blended and extruded and the film blown in the manner described in Example 3 except that the premix of polyisobutene and glycerol monooleate was heated to 120° F. The film was drawn at 100 ft./min. and one side thereof subjected to corona discharge treatment in the manner described in Example 7. Good stretch and cling properties were obtained.

EXAMPLE 9

A series of rolls of stretch film was prepared from the composition set forth below:
USI "80159": 58% by weight
Dow "61500.45": 40% by weight
"Chevron 32": 1% by weight
glycerol monooleate: 1%
sodium stearate: 0.2% by weight In the manufacture of each roll the components were blended and extruded and the film blown in the manner described in Example 8 except that the extrusion temperature was varied, with one roll run away 400° F., one at 440° F., one at 480° F. and one at 520° F. The cling and optical properties of the film of this example were compared, and film gloss was found to be best at 440°-480° F. No other temperature effect on optical or cling properties was observed, but film stability was adversely affected by inadequate melt strength at 520° F.

EXAMPLE 10

A series of rolls of stretch film, each 20" wide×0.8 mils thick×2000' long, was prepared using the compositions set forth below:

| Component | Blend G | Blend H | Blend I | Blend J | Blend K |
|---|---|---|---|---|---|
| USI "80159" | 58% | 58% | 58% | 58% | 58% |
| Dow "61500.45" | 40% | 40% | 40% | 40% | 40% |
| polyisobutene having a molecular weight of 950 sold under the trade designation "Chevron 24" by Standard Oil Company of California | 0.5% | 1% | 0.5% | 1% | 0.5% |
| glycerol monooleate | 1.5% | 1% | 0.5% | 1% | — |
| sodium stearate | 0.2% | 0.2% | 0.2% | 0.2% | 0.2% |

In each case the components were blended and extruded and the film blown in the manner described in Example 9. Favorable cling, elongation, neck-down, puncture, tear, stress relaxation and elastic recovery properties were exhibited by the film of this example.

EXAMPLE 11

A series of rolls of stretch film each 20" wide×0.8 mils thick×2000' long was prepared from a blend which included the following components plus an oil-soluble dye colorant.
USI "80159": 58%
Dow "61500.45": 40%
glycerol monooleate: 1%
"Chevron 24": 1%
sodium stearate: 0.2%

The components were blended and extruded and the film blown in the manner generally described in Example 10 with the melt heated to 460° F. in the extruder. In each case a dye was added to the polyisobutene/glycerol monooleate premix which was injected at 29 cc/min. into the extruder head. Dyes utilized included: Macrolex Red EG in the range of 0.08-0.4%; Spirit Fast Scarlet in the range of 0.08-0.80%; Macrolex Blue RR in the range of 0.08-0.08% and Macrolex Red 5B in the range of 0.08-0.80%. Attractively colored films were obtained in accordance with the runs of this example without adverse effect on film or cling properties.

EXAMPLE 12

A series of rolls of stretch film was prepared, each 20" wide×0.8 mils thick×2000' long. One of these films was prepared from a composition containing 0.1% sodium stearate, another from a composition containing 0.2% sodium stearate, and another from a composition containing 0.4% sodium stearate, each of which had the following proportions of other components:
USI "80159": 58%
Dow "61500.45": 40%
"Chevron 24": 1%
glycerol monooleate: 1%

The components were blended and extruded and the film blown in the manner described in the Example 1 and the film drawn at 100 ft./min., after which one side of the film was passed through a corona discharge zone under the conditions described in Example 7. The films were evaluated and compared with respect to the optical and cling properties. Each of the films in this example were found to be advantageous in those respects and all possessed favorable elongation, neckdown, puncture resistance, tear resistance, stress relaxation and elastic recovery properties.

EXAMPLE 13

A series of rolls of stretch film, each 20" wide×0.8 mils thick×2000' long, was prepared using the compositions set forth below:

| Component | Blend L | Blend M | Blend N | Blend O |
|---|---|---|---|---|
| USI "80159" | 58% | 58% | 58% | 58% |
| Dow "61500.45" | 40% | 40% | 40% | 40% |
| glycerol monooleate | 1% | — | 1% | — |
| polyisobutene having a molecular weight of 650 sold under the trade designation "Polyvis 025SH" by Cosden Oil and Chemical Company, Subsidiary of American Petrofina, Inc. | 1% | 1.5% | — | — |
| polyisobutene having a molecular weight of 450 sold under the trade designation "Polyvis 06SH" by Cosden Oil and Chemical Company | — | — | 1% | 1.5% |
| sodium stearate | .2% | .2% | .2% | .2% |

Two rolls of film were produced from each of the blends of this example. For one roll of each blend, the film was produced in the manner described in Example 1, with the film drawn at 100 ft./min. and the premix of polyisobutene and glycerol monooleate injected at 29 cc/min. For the other roll, the polyisobutene and glycerol monooleate were tumble blended with the ethylene/vinyl acetate and linear low density polyethylene resins. In each case stretch film was prepared having advantageous elongation, neck-down, puncture, tear, stress relaxation and elastic recovery properties. The stretchfilm with the Polyvis 06SH was the only film with less than desirable cling.

EXAMPLE 14

A series of rolls of stretch film, each 20" wide×0.8 mils thick×2000' long, was prepared from the compositions set forth below:

| Component | Blend P | Blend Q | Blend R | Blend S |
|---|---|---|---|---|
| USI "80159" | 56% | 56% | 56% | 56% |
| Dow "61500.45" | 40% | 40% | 40% | 40% |
| "Chevron 32" polyisobutene | 4% | 4% | 4% | 4% |
| glycerol monooleate | — | 1% | — | 1% |
| sodium stearate | — | — | 0.2% | 0.2% |

In the preparation of each roll the components were blended and extruded and the film blown in the manner described in Example 1, except that the polyisobutene (and glycerol monooleate when included) were preheated to 150° F., one half of the preheated oil was mixed with the resin blend, and the other half was injected at a rate of 22 cc/min. The sodium stearate was tumble blended with the resins. The film was drawn at 100 ft./min. and one side thereof subjected to corona discharge treatment in the manner described in Example 7. Each of the films produced in accordance with this example had favorable elongation, neck-down, puncture, tear, stress relaxation and elastic recovery properties. Those containing either glycerol monooleate or sodium stearate exhibited improved differential cling properties as compared to the film containing only polyisobutene, with the most favorable cling properties possessed by films which contained both of the auxiliary components. Most favorable lubricity was exhibited by those films containing glycerol monooleate and the most favorable optical properties by those containing sodium stearate.

EXAMPLE 15

A series of rolls of stretch film, each 10" wide×0.8 mils thick×2000' long, was prepared using the composition set forth below:

| Component | Blend T | Blend U | Blend V | Blend W |
|---|---|---|---|---|
| USI "80159" | 66% | 66% | 66% | 66% |
| Dow "61500.45" | 30% | 30% | 30% | 30% |
| "Chevron 32" | 4% | 4% | 4% | 4% |
| glycerol monooleate | — | 1% | — | 1% |
| sodium stearate | — | — | 0.2% | 0.2% |

The films were prepared and subjected to corona discharge treatment in the manner described in example 14. Again each of the films of this example exhibited the favorable properties described above, but the differential cling properties were enhanced by glycerol monooleate and sodium stearate, lubricity was improved by the presence of glycerol monooleate, and optical properties were improved by the presence of sodium stearate.

EXAMPLE 16

The film preparations of Example 14 and 15 were repeated except that "Chevron 24" was substituted for "Chevron 32". Results were generally comparable to those of Examples 14 and 15 with similar observed effects of glycerol monooleate and sodium stearate.

EXAMPLE 17

Using the method described in Example 11, a roll of stretch film 30" wide×0.8 mils thick×6000' long was produced from the composition set forth below:
 USI "80159": 63%
 Dow "61500.45": 35%
 "Chevron 32": 1%
 glycerol monooleate: 1%
 sodium stearate: 0.2%
The film of this example exhibited superior stretch, cling and optical properties.

EXAMPLE 18

A series of rolls of stretch film, each 0.8 mils thick×2000' long, was prepared using the composition set forth below:
 DuPont "3135": 62.8%
 Dow "61500.45": 35%
 "Chevron 32 ": 1%
 glycerol monooleate: 1%
 sodium stearate: 0.2%
Rolls of film were produced having widths of 20", 30" and 45".

The films were prepared and subjected to corona discharge treatment in the manner described in Example 14. Favorable stretch and cling properties were found.

EXAMPLE 19

A series of rolls of stretch film, each 20" wide×0.8 mils thick×2000' long, were prepared from the compositions set forth below:

| Component | Blend T | Blend U | Blend V | Blend W | Blend X | Blend Y | Blend Z |
|---|---|---|---|---|---|---|---|
| Ethylene/vinyl acetate copolymer sold under the trade designation "Ultrathene 657" by USI Chemicals Co. Division of National Distillers | 65% | 65% | 65% | 65% | 65% | 65% | 65% |
| Dow "61500.45" | 35% | 35% | 35% | 35% | 35% | 35% | 35% |
| "Chevron 32" | — | 1% | 1% | 1% | 2% | 1% | 2% |
| glycerol monooleate | (trace) | 1% | 1% | 2% | 1% | 2% | 1% |

| Component | Blend T | Blend U | Blend V | Blend W | Blend X | Blend Y | Blend Z |
|---|---|---|---|---|---|---|---|
| sodium stearate | — | 0.29% | — | — | — | 0.3 | 0.3 |

The films were prepared and subjected to corona discharge treatment in the manner described in Example 14 except that the intensity of the corona discharge field was varied over a range of about 1 v.-amp to about 5 v.-amp/ft.$^2$/min. Although all the films exhibited good stretch properties and self-cling properties, differential cling was not marked in the absence of sodium stearate. Those blends containing both glycerol monooleate and sodium stearate showed the most advantageous differential cling properties.

EXAMPLE 20

Two rolls of stretch film, each 20" wide×0.8 mils thick×2000' ft. long, were prepared from the composition set forth below:
 DuPont "3135": 56.1%
 linear low density polyethylene having a specific gravity of 0.920 and a melt index of 1.0 sold under the trade designation "Dowlex 2045" by the Dow Chemical Company: 40%
 "Chevron 32": 3%
 glycerol monooleate: 0.5%
 sodium stearate: 0.4%

The films were prepared and subjected to corona discharge treatment in the manner described in Example 14. Tension at the winder was varied to determine the effect of winding tension on film properties. It was found that no adverse effects were incurred up to a tension of about 3 lbs./linear inch but at tensions above that level some prestretch was observed.

EXAMPLE 21

Using the composition described in Example 20, two series of rolls of stretch film were prepared. In one series the rolls were each 2000' long×20" wide×1.5 mils thick while in the other the dimensions of each roll were 1500' long×20" wide×2.0 mils thick. The films were prepared and subjected to corona discharge treatment in the manner described in Example 14 except that the 1.5 mil film was drawn at 65'/min. and the 2.0 mil film drawn at 50'/min. In each instance the polyisobutene was injected into the extruder head at 19 cc/min. Favorable stretch, cling and optical properties were exhibited by the films of this example.

EXAMPLE 22

A series of rolls of stretch film, each 20" wide×0.8 mils thick×2000' long, was prepared using the compositions set forth below:

| Components | Blend AA | Blend BB | Blend CC | Blend DD | Blend EE | Blend FF |
|---|---|---|---|---|---|---|
| USI "Ultrathene 657" | 63% | 62.7% | 62.5% | 63% | 62.7% | 62.5% |
| Dow "61500.45" | 35% | 35% | 35% | 35% | 35% | 35% |
| polyisobutene | 3% | 3% | 3% | — | — | — |
| glycerol monooleate | — | 0.3% | 0.5% | 3% | 3.3% | 3.5% |

Films were prepared in the manner generally described in Example 14 except that none of the films were subjected to corona discharge treatment. In each instance the film was drawn at a rate of 130 ft./min. with polyisobutene injected at 35 cc/min. in runs AA, BB, and CC; and glycerol monooleate injected at 35 cc/min. in runs DD, EE, and FF. In runs BB and CC, glycerol monooleate was incorporated as a 10% concentrate in USI "Ultrathene 657" while in runs DD and EE the glycerol monooleate was incorporated both as a concentrate and by injection into the extruder head. Films of this example exhibited favorable stretch and cling properties but not differential cling.

EXAMPLE 23

Using the method generally described in Example 1, a series of film was prepared containing approximately 65% high molecular weight ethylene/vinyl acetate copolymer, approximately 30% by weight linear low density polyethylene, ½ to 3% by weight glycerol monooleate, ½ to 5% by weight polyisobutene and 0.5–5% sodium stearate. The polyisobutene and glycerol monooleate were premixed and injected into the extruder with the tumble blended resins. The sodium stearate was incorporated as a 10% by weight concentrate in ethylene vinyl/acetate copolymer. Extrusion temperature was in the range of 420°–440° F. and a range of film thicknesses 0.5 to 2 mils was produced. One side of the film was subjected to corona discharge treatment in the manner described in Example 7.

The films of this example were wrapped on an Infra Pak Sidewinder II at tensions ranging from 15 through 30 lbs. as measured on a load cell that was mounted on the wrapper. Resultant elongations ranged from 30 to 100%. Measurements were made of elongation, tension forces, amount of neck-down, tear resistance and short and long term cling.

Tear resistance was measured by taking an knife and cutting a 3–5" slit in the film while under tension and measuring the extent of additional propagation of the tear. In essentially every case until the tension approach that at which puncture tear failure was experienced (or where the temperature was above 85° F.), tear propagation was no more than one inch beyond the length of the initial cut.

In the cling test, an end of the film was folded around a corner of the load over a prior wrap and extending about three to four inches beyond the corner. After allowing the wrapped film to rest in this position for a brief period to ascertain that it held together, the end of the film was peeled back until it had been peeled around the corner so that the retractive forces in the film were tending to break the seal bond with nothing to resist further peeling except the cling. Under tensions 15 to 30 pounds, cling was deemed adequate if the film would resist further separation for periods of two minutes or more. All the films tested were acceptable except those in which the polyisobutene level was below 1.5% and the glycerol monooleate level above 0.8%.

Gloss tests were made on the film using ASTM procedure D2457 and haze tests were run using ASTM procedure D1003. Haze levels were generally below 4% while 45° gloss measurement was about 73. Without sodium stearate the gloss value for the films of the invention is approximately 55.

Films prepared in accordance with this example were further subjected to a lap shear test in which a film sample 3" wide is pressed down over a one inch length onto another 3" wide sample supported on glass. The two samples are then pulled apart on an Instron tensile tester at a separation rate of 5" per minute. For 80 gauge films the force required to separate the two film was 0.5–0.7 lbs/in. treated side to treated side; 3.3–3.5 lbs./in. untreated side to untreated side; and approximately 3.1 lbs./in treated to untreated. The latter value is close to optimal for most palletized load wrapping applications. However, for wide films of very thin gauge, incipient picking may dictate a slightly lesser cling. This is achievable by a reduction in the proportions of tackifier or increase of alkali metal stearate and/or polyol/fatty acid monoester.

EXAMPLE 24

Varying gauge 20" wide films prepared in accordance with Example 23 were subjected to elongation tests to determine stretch vs. force profiles as well as the stretch at which ultimate failure occurred. Elongation tests were carried out by wrapping a palletized load using a Lan Tech wrapper provided with a load cell to determine the force on the film. Evaluation was also made for limit in tension before occurrence of puncture. Any kind of tearing or loss of cling were also noted.

In the puncture tests, eight wraps were made on a pallet load and tension increased until puncture occurred at 1, 2 and 3" deep 2×4 wooden corners glued onto the load 12" above the top of the pallet. When puncture occurred, observation was made to determine whether puncture tearing ensued. When the film had been wrapped on the load it was checked for long and short term cling and then cut to determine whether tear propagation was experienced under the tension in the film. Neck-down was also measured as a function of tension.

Shown in FIG. 1 is a plot of the extent of neck-in vs. stretch in 20" wide films of varying thicknesses. As demonstrated by this plot, even relatively thin gauge films exhibited superior neck-down properties under substantial elongation.

Figure 2:
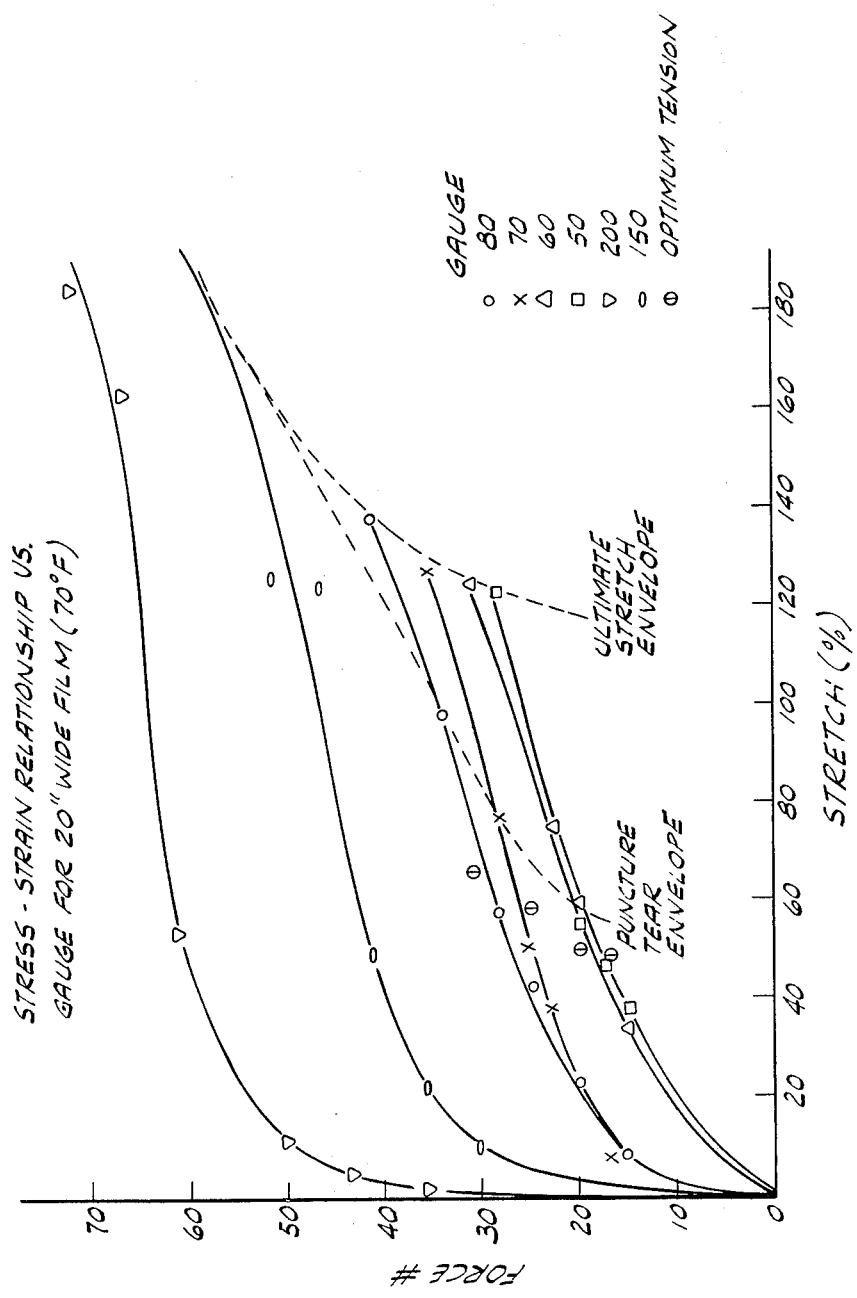
FIG. 2 is a plot of the stress-strain relationships observed in elongation tests of films of the invention produced in 20" initial widths and various thicknesses and tested at 70° F.

Set forth in FIG. 2 is a plot of elongation vs. stress for the films of this example. Also shown in FIG. 2 are the puncture tear envelope, beyond which tear propagation occurs upon puncture, and the ultimate stretch envelope, beyond which ultimate failure is experienced. While all of the films of this example exhibited highly favorable stretch characteristics, the plot demonstrates that both ultimate stretch and, especially, tear characteristics improved markedly with film thickness. In running the tests it was also observed that picking and blocking resistance improved with film thickness. The latter effects are unsurprising since the strength of the film is increased proportionate to the thickness while the area exposed for adhesion to overlapping film remains constant.

Figure 3:
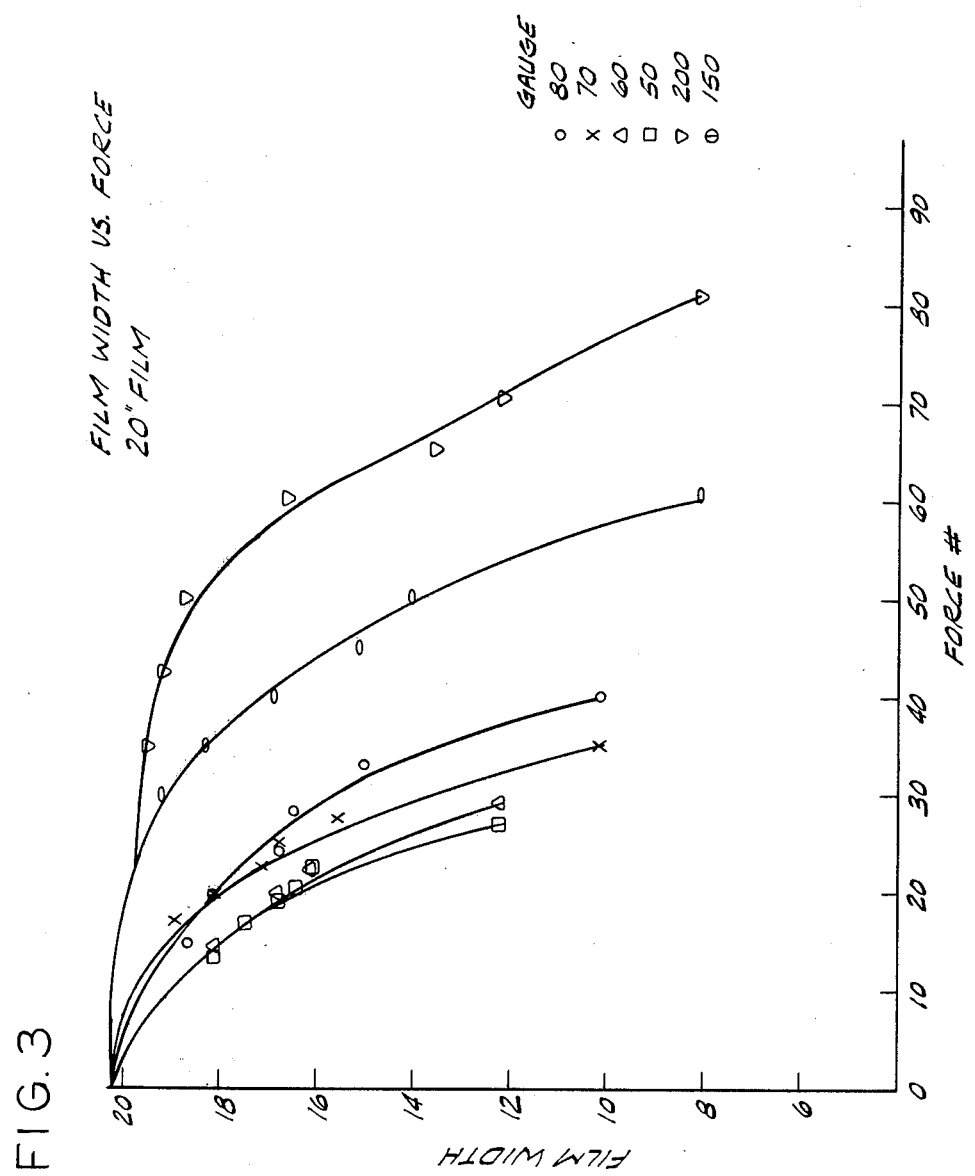
FIG. 3 is a plot of film width vs. force for 20" initial width film produced in various thicknesses and subjected to elongation tests.

FIG. 3 is a plot of film width vs. tension force exerted on the 20" films of this example. This plot again demonstrates the favorable neck-down properties of the films of the invention.

For films of 30" and 40" in width, rather than 20" it was not possible to use the load cell to measure the tension force. However, neck-down was measured as a function of elongation, with the extent of elongation calculated based on reduction of film weight per unit area. The results of these tests are plotted in FIG. 4.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

What is claimed is:

1. A composite film comprising:
   a first layer comprising at least about 90% by weight of high molecular weight copolymer of ethylene and vinyl acetate containing between about 4 and about 25% by weight of repeating units derived from vinyl acetate and having a melt index of between about 0.1 and about 4.0 and a tackifier selected from the group consisting of a low molecular weight polyisobutene, polyterpenes, amorphous polypropylene and microcrystalline wax; and
   a second layer lamellarly adhered to said first layer and comprising at least about 90% by weight of a linear low density polyethylene having a specific gravity of between about 0.917 and about 0.945.

2. A composite as set forth in claim 1 further comprising a third layer lamellarly adhered to said second layer on the side thereof opposite said first layer, said third layer comprising at least about 90% by weight of a high molecular weight copolymer of ethylene and vinyl acetate containing between about 4 and about 25% by weight of repeating units derived from vinyl acetate and having a melt index of between about 0.1 and about 4.0.

3. A composite film as set forth in claim 1 wherein said first layer contains between about 0.5 and about 6% by weight of said tackifier.

4. A composite film as set forth in claim 3 wherein said tackifier comprises a low molecular weight polyisobutene.

5. A composite film as set forth in claim 1 wherein said first layer further comprises a monoester of a fatty acid and a polyol.

6. A composite film as set forth in claim 5 wherein said first layer contains between about 0.25% and about 3% by weight of said monoester.

7. A composite film as set forth in claim 6 wherein said monoester comprises glycerol monooleate.

8. A composite film as set forth in claim 5 wherein said monoester comprises glycerol monooleate.

9. A composite film as set forth in claim 2 wherein said third layer further comprises a tackifier selected from the group consisting of a low molecular weight polyisobutene, polyterpenes, amorphous polypropylene, and microcrystalline wax.

10. A composite film as set forth in claim 9 wherein said third layer contains between about 0.5% and about 6% by weight of said tackifier.

11. A composite film as set forth in claim 10 wherein said third layer further comprises a monoester of a fatty acid and a polyol.

12. A composite film as set forth in claim 11 wherein said first and third layers each contain between about 0.5 and about 6% by weight of said tackifier and between about 0.25 and about 3% by weight glycerol monooleate.

* * * * *